(12) United States Patent
Schweigert et al.

(10) Patent No.: US 7,388,364 B2
(45) Date of Patent: Jun. 17, 2008

(54) DEVICE FOR COVERING THE PEAK LOAD

(75) Inventors: Harald Schweigert, Vienna (AT);
Wilhelm Appel, Laa/Thaya (AT)

(73) Assignee: Siemens AG Osterreich, Vienna (AT)

( * ) Notice: Subject to any disclaimer, the term of this patent is extended or adjusted under 35 U.S.C. 154(b) by 53 days.

(21) Appl. No.: 11/498,444

(22) Filed: Aug. 3, 2006

(65) Prior Publication Data

US 2007/0035290 A1    Feb. 15, 2007

(51) Int. Cl.
*G01R 11/32* (2006.01)
(52) U.S. Cl. ...................................... 324/142
(58) Field of Classification Search ................ 324/142, 324/765, 158.1, 760; 363/125, 131, 98, 16; 361/93.1, 79; 702/60–64
See application file for complete search history.

(56) References Cited

U.S. PATENT DOCUMENTS

| | | | |
|---|---|---|---|
| 5,182,463 | A | 1/1993 | Yamaoto et al. |
| 5,500,561 | A | 3/1996 | Wilhelm et al. |
| 5,917,251 | A | 6/1999 | Schermann et al. |
| 6,555,997 | B1 * | 4/2003 | De Vries et al. ............... 324/74 |
| 6,680,547 | B1 | 1/2004 | Dailey |
| 6,943,538 | B2 * | 9/2005 | Choi ........................... 324/142 |
| 2001/0012211 | A1 | 8/2001 | Hasegawa et al. |
| 2002/0186576 | A1 | 12/2002 | Kanouda et al. |
| 2005/0190517 | A1 | 9/2005 | Schweigert et al. |

FOREIGN PATENT DOCUMENTS

| | | |
|---|---|---|
| EP | 1253696 A1 | 10/2002 |
| JP | 01069219 A | 3/1989 |
| JP | 06121470 A | 4/1994 |
| JP | 2000-059993 A | 2/2000 |
| JP | 2000050500 A | 2/2000 |
| JP | 2002027668 A | 1/2002 |

(Continued)

OTHER PUBLICATIONS

Office Action dated Aug. 31, 2007; corresponding Russian application No. 2006133375(09) (3 pages); translation (2 pages).
International Search Report, PCT/AT05/000045 dated Jul. 11, 2005 (3 pages).
Written Opinion, PCT/AT05/000045 dated Jul. 11, 2005, (5 pages) (translation 2 pages).

(Continued)

*Primary Examiner*—Ha Tran Nguyen
*Assistant Examiner*—Tung X. Nguyen
(74) *Attorney, Agent, or Firm*—Anton P. Ness; Fox Rothschild LLP

(57) ABSTRACT

A device for covering the peak load of an electrical consumer (VB) that is connected to an alternating current terminal of a public electricity network (ENT). A power inverter (WR) is fed from a direct current accumulator (BAT) and is connected in parallel at the output thereof to the electricity supply (EB) of the consumer (VB). A measuring device (Z1, Z2) is connected in the connection circuit (EN) of the consumer and a control device (STE). With the aid of the measuring device (Z1, Z2), the control device monitors the energy consumption of the consumer (VB), estimates from it a consumption quantity of electrical energy ($E^*(T)$) up to the end (T) of a given time interval, for example via linear extrapolation, and in the event that the prognosis value obtained in this way exceeds a given threshold value ($E_{max}$), puts the power inverter (WR) in operation in order to support the supply of the consumer.

9 Claims, 2 Drawing Sheets

FOREIGN PATENT DOCUMENTS

| | | |
|---|---|---|
| JP | 2002034158 A | 1/2002 |
| JP | 2002247761 A | 8/2002 |
| JP | 2002369407 A | 12/2002 |
| JP | 2003153347 A | 5/2003 |
| JP | 2003244840 A | 8/2003 |
| JP | 2003259566 A | 9/2003 |
| SU | 924724 | 4/1982 |
| SU | 1605294 A1 | 2/1988 |

OTHER PUBLICATIONS

Supplemental International Search Report, PCT/AT05/000045 dated Jan. 30, 2006 (3 pages).

Notification of Reason for Refusal, dated Dec. 11, 2007, corresponding Japanese Application No. 2006-553387 (5 pages).

Office Action, Russian corresponding patent application SU 924724, dated Jan. 22, 2008 (3 pages) (1 page translation).

* cited by examiner

DEVICE FOR COVERING THE PEAK LOAD

CROSS-REFERENCE TO RELATED APPLICATIONS

This application claims priority from PCT Application No. PCT/AT05/000045 filed Feb. 10, 2005 which in turn claims priority from Austrian Patent Application No. A 272/2004 filed Feb. 19, 2004.

FIELD OF THE INVENTION

The invention relates to a device for covering the peak load of an electrical consumer that can be connected to an alternating current terminal of a public electricity network.

A device of this type is described in Japanese Patent Application 2003-244840 A. To bridge consumption peaks, an average energy consumption of the consumer is calculated in a system control, and, if this average value exceeds a given value, a direct current power supply is brought into circuit via a direct current—alternating current converter. Japanese Patent Application 2003-259566 A discloses a similar alternating current power supply. U.S. Pat. No. 5,500,561 A and US 2002/0186576 A1 describe supplies of electricity of direct current loads in which a load compensation is made via direct current auxiliary accumulators.

BACKGROUND OF THE INVENTION

Electric companies often have, especially in the commercial sector, rate models that are oriented not just toward overall consumption, but also toward consumption peaks, that is, according to the maximum value of (integrated) temporary consumption (likewise measured in kWh since it is related to a short time interval). Here, the current consumption is integrated over a given time unit, for example, 15 minutes, and the highest value at that time is stored. The underlying purpose of this procedure is for the energy provider to have to take into account also the supply of energy in the rate, even if the extent of the supply is not completely exhausted.

Known solutions to avoid exceeding a given maximum value during a consumption peak employ, for example, a peak load watchdog. These are consumption meters that continually measure the current consumption and trigger an alarm if the maximum is about to be exceeded. In such a case it is left up to the operator of the consumer system to reduce consumption, for example, by shutting off equipment that is not absolutely necessary. In further developed solutions, the peak load watchdogs are automated to the extent that they directly trigger the temporary shutdown of a portion of the consumer system, for example, non-time-critical consumers, such as a hot water heater.

In addition, there are also other scenarios in which it is important to avoid or compensate for peak loads. It often occurs that in a business a system needs a high level of power for only a brief time (for example, a few minutes a day), while otherwise there is generally a significantly lower level of energy consumption.

European Patent Application 1 253 696 A1 describes a supply of electricity for a load having predictable load peaks, where, based on a signal that reports a load peak, a battery is brought into circuit to prevent an overload of the normal power source (PWR). This method assumes advance knowledge of the load peak times and requires an additional signal line from the load to the supply control.

It is desired to provide a power supply that covers consumption peaks and thereby "hides" them with respect to the supply network. Of course, this is supposed to occur automatically (without intervention on the part of the operator) and without interruption of the supply of electricity to the consumer or individual consumer devices.

BRIEF SUMMARY OF THE INVENTION

The objective is achieved by a device for covering the peak load of the type comprising a power inverter, which is fed by a direct current accumulator and can be connected in parallel, at the output thereof, to the electricity supply of the consumer; a measuring device that can be connected in the connection circuit of the consumer; and a control device that is directed toward monitoring, with the aid of a measuring device, the energy consumption of the consumer and, in the event that the energy consumption value obtained in this manner exceeds a given threshold value, putting the power inverter in operation in order to support the supply of the consumer.

This solution achieves a reliable and improved bridging—or better, compensation—of consumption peaks of the consumer. In this way it is possible to design the system connection for a lower wattage, and/or a more favorable electricity rate.

In a preferred embodiment of the invention, the energy or power fed into the connection circuit via the power inverter can be regulated. The power fed through the power inverter can be infinitely adjusted via the control device. For this purpose it is helpful if the control device is equipped to set the energy that is fed through the power inverter to a value that results in the energy consumption or the consumption quantity being below the given threshold value.

A specific monitoring of the current consumption is expedient, especially for the case that the energy consumption integrated over measurement intervals is used for the calculation of the electricity rate. In a preferred variant, a linear extrapolation is used to estimate the consumption quantity. Then the power inverter is put in operation in the event that the quantity of electrical energy consumed that is obtained via linear extrapolation from the previous consumption quantity and the instantaneous energy consumption up until the end of the time interval, were to exceed a given threshold value.

Furthermore, a charger, which may be supplied with energy from the connection circuit of the consumer, may advantageously be provided for charging the direct current accumulator. Here it is beneficial if the charger can be switched on and off by the control device and, moreover, if the control device can be set to switch on the charger only during those times that the power inverter is not in operation.

What is more, it is advantageous if the threshold value is determined by the device itself. For this purpose the control device can be set to log the energy consumption of the consumer over a consumption period and from the consumption curve logged in this manner calculate a threshold value for the next consumption period according to a given standard. For example, the maxima of the consumption in the logged consumption period can be determined, and that maximum is selected as the new threshold value for which, starting from the time-dependent consumption of the logged consumption period, a reduction of the consumption drawn from the electricity network below this maximum is possible by switching on the power inverter in times of peak consumption (specifically if the consumption exceeds the value of this maximum) without the storage capacity of the direct current accumulator being exceeded.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION OF THE INVENTION

Figure 1:
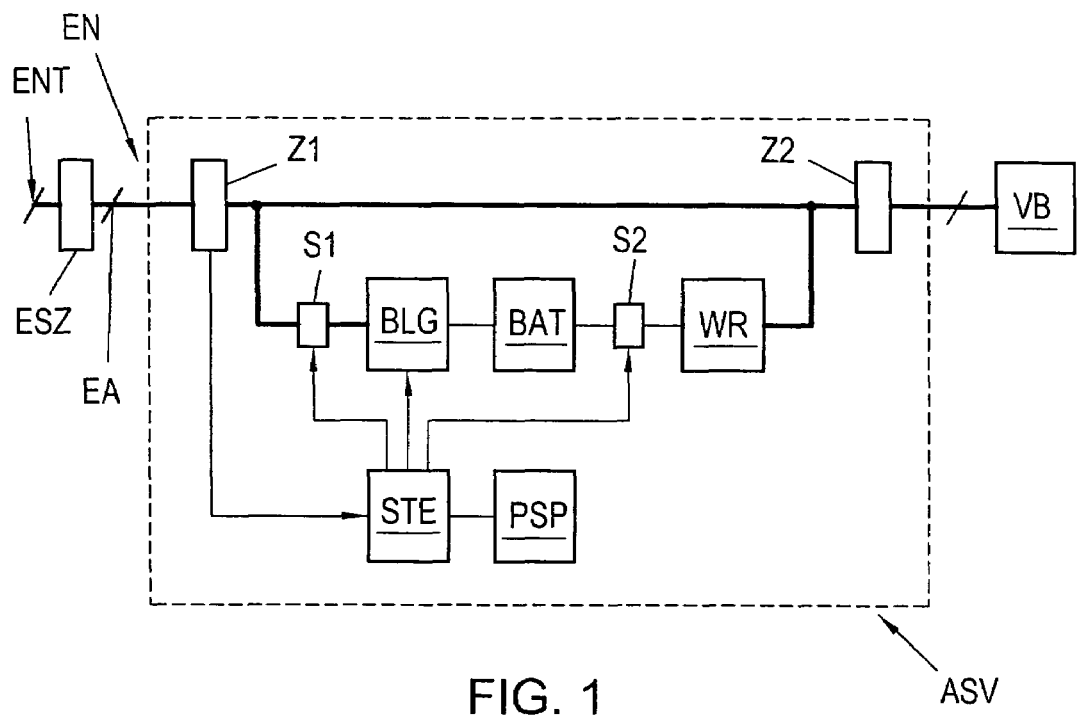
FIG. 1 is a block diagram of a supply of electricity of the exemplary embodiment.

In the drawings, like numerals indicate like elements throughout. Certain terminology is used herein for convenience only and is not to be taken as a limitation on the present invention. The term "consumer" refers to an electrical device rather than to an individual or a business. The embodiments illustrated below are not intended to be exhaustive or to limit the invention to the precise form disclosed. These embodiments are chosen and described to best explain the principle of the invention and its application and practical use and to enable others skilled in the art to best utilize the invention.

A preferred embodiment of the invention relates to the supply of electricity for the electrical devices of a fast food outlet, such as a hot dog stand. Naturally, the invention is not restricted to this embodiment; rather, it and its details represent only one non-limiting example of the different application possibilities of the invention.

FIG. 1 shows a block diagram of the supply of electricity for the fast food outlet according to the invention. The electrical devices of the fast food outlet, such as a plurality of hotplates having a maximum power consumption of 1.5 to 2 kW each as well as various warming and cooling devices, are collectively represented as consumer VB. The supply of electricity is fed from the public electricity network ENT, which provides the fast food outlet a connection EA, in the case considered here a connection for a commercial operation designed for example for 10 kW. The amount of power drawn through connection EA is measured in the customary manner using an integrated electricity meter ESZ, which is owned by the operator of network ENT and is not allowed to be manipulated by the subscriber of connection EA (i.e., the operator of the fast food outlet).

Connection EA in the example considered here is an alternating current single phase connection (phase and directly earthed conductor); in the same way, other connection types are also possible, especially so-called three-phase or polyphase current connections. The boldface lines in FIG. 1 represent alternating current lines having an appropriate number of conductors.

The invention is designed to limit consumption peaks of the consumer VB that would lead to an exceeding of a threshold or maximum value via additional feed of energy, for example, from a storage device such as a battery. It is expedient—depending on the definitive rate model—to set the previous maximum value (or if, for example, the rate is tiered, that value which represents the threshold for the next rate tier) as such a threshold value. No matter what type of consumer is involved, the supply of electricity of the consumer at as low a rate as possible is to be provided and ensured.

According to the invention, a system ASV ("Ausgleichende Stromversorgung"—i.e., a compensating power supply system), whose main task is the compensation of load peaks of the consumer, is to be connected between consumer VB and mains connection EA. The basic function of system ASV corresponds to an uninterruptible power supply for alternating current, but with a difference that it feeds power precisely when there is an existing mains supply electricity and not, or not just, when there is a failure of the mains supply.

In system ASV according to the invention, a control unit STE continually detects the consumption of the system with the aid of an integrated electricity meter Z1, which measures the energy drawn at the input. The current consumption is integrated at that time over equal time intervals, as happens with consumption meter ESZ of electricity network ENT. In addition a battery BAT (or another suitable device for the reversible storage of energy) and a power inverter WR are provided.

Battery BAT is designed as a reversible direct current accumulator for an energy content that is at least large enough to supply a portion of the peak load of the system for at least one integration period; admittedly, which battery size is reasonable and logical depends on the particular given application scenario. In the example considered here, the battery BAT is an array of lead accumulators having an overall electric charge of approximately 150 Ah at a battery voltage of approximately 36 V; with this selection, one to two hotplates (approximately 2 kW) can be reliably supplied with power for an hour. For the voltage selected here, a motor vehicle battery or a combination of such batteries can be of beneficial use.

The battery is supplied with the required direct current via a commercially available battery charger BLG, the power consumption of charger BLG being small compared to consumer VB. For example, for a battery charger that is designed for charging the battery overnight with 36 V/150 Ah (e.g., for 7.5 A at 36 V), a nominal power of approximately 550 W is produced.

Power inverter WR is designed for a connection voltage that corresponds to the battery voltage and is used to convert the direct current supplied by the battery into an alternating current corresponding to the parameters of the mains connection. Power inverter devices of this type are well known.

The charging of battery BAT (i.e., activation of charger BLG and switching off power inverter WR) on the one hand and the discharging (i.e., activation of power inverter WR) on the other hand, are controlled by control device STE via switches S1 and S2 as described below. If required, switch S1 and/or S2 may also be integrated within charger BLG or power inverter WR, especially if the device in question permits electronic control.

Control device STE is realized, for example, using a microprocessor that performs the integration of the power consumption in the manner of the electricity meter intrinsic to the network and stores the values obtained in this way together with the associated instant, for example, in a non-volatile memory PSP on hard disk or exchangeable diskette. Moreover, based on the current energy consumption, it generates a prognosis (see FIG. 2) about the total value at the end of the currently running integration period. In this way, the control device obtains an estimate or prediction of whether an exceeding of the threshold value, especially of an earlier measured rate maximum value, is impending in the currently running integration period. If this is the case, i.e., if exceeding the threshold is of concern, the power inverter is switched on, which consequently discharges energy from the battery into the local connection circuit EN of the consumer. In an expedient way, charger BLG should be shut down in order to prevent an "energy circulation" with the associated losses; moreover, this also contributes to the reduction of the power consumed. As a result a portion of consumer VB connected to connection EA is also supplied by battery BAT, and the power absorbed from network ENT is reduced. In this way an exceeding of an earlier maximum value and thus an increase of the electricity rate is avoided.

In order not to fill the data memory unnecessarily, controller STE deletes all values between two maximum states, because such consumption values have no further significance, even for subsequent evaluations (for control purposes).

Expediently, battery BAT and associated charger BLG can be designed externally with respect to power supply system ASV in order to enable an easier adaptation of the overall system to the prevailing conditions at the location of consumer VB.

Instead of or in addition to electricity meter Z1, a second electricity meter Z2 may be provided at connection EA on the consumer side that measures the amount of energy supplied to consumer VB at the output; in principle a plurality of consumers may also be connected; most simply, this is accomplished via parallel connection of the consumer to a "collective consumer", which appears in place of consumer VB of FIG. 1.

It should be noted that, as an alternative to the solution according to the invention, it is of course possible to operate particular consumers via an uninterruptible power supply (UPS) with battery backup supply and, when there is a response of the maximum load warning device, to interrupt the mains supply of the UPS and supply the consumer for a brief time via the batteries. This solution has the disadvantage that it must be determined in advance which consumer to supply via the UPS; in operation, a supporting feed into the electricity network is not possible with the UPS. In the solution of the invention, power is fed directly into connection circuit EN on the consumer side of the electricity meter, and the power fed by electricity network ENT is consequently reduced by the total amount of power fed in from the battery-fed converter, namely power inverter WR. Power inverters that were originally designed for feeding electrical energy from photovoltaic systems into the public electricity network can also be used advantageously as converters. These power inverters already have all safety devices that are necessary for a safe infeed operation, especially with regard to the requirements of the network operator, such as a mains voltage detection, that in the event of an outage of the mains (for example, because of maintenance work) automatically terminate the infeed of electricity in order to enable safe maintenance work.

If the direct current of battery BAT and the infeed voltage for the converter (power inverter WR) are different—for example, if the battery voltage is to be kept to a safe low-voltage level—the input voltage needed for operation of the converter can be produced by inserting a DC-DC converter in the circuit. Inversely, if the output voltage of power inverter WR does not correspond to the voltage of network ENT,EN, a 50 Hz power transformer may be connected in series with the power inverter.

Figure 2:
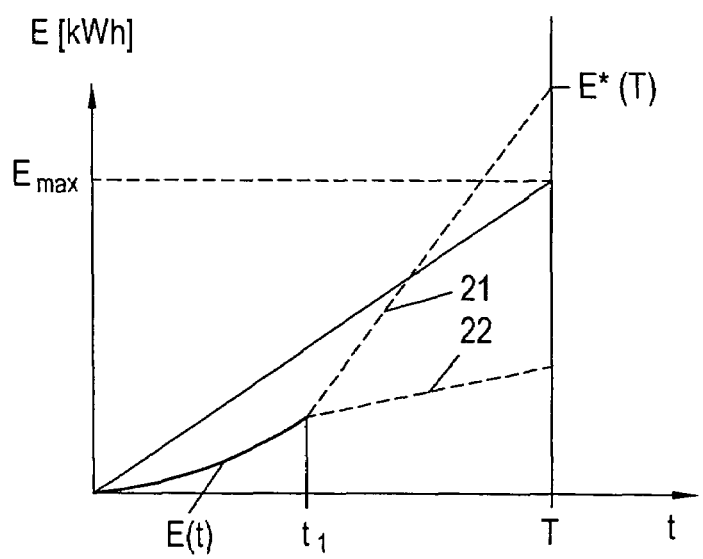
FIG. 2 is a graphic representation of a sample extrapolation of the energy consumption.

FIG. 2 illustrates the linear prognosis of control unit STE in a case study. In control unit STE, as already mentioned, the instantaneous consumption starting at the beginning of the current integration period is continuously integrated and in this way the energy E(1) consumed so far within the current time interval, is calculated. FIG. 2 shows such a representation of the consumption quantity E(t) (measured, for example, in kWh) as a function of time t, only the current integration period being shown, which starts at t=0 and ends at t=T. T is the duration of the period, e.g. 15 min. Also shown is the currently applicable threshold value $E_{max}$ (earlier consumption maximum value), which is not to be exceeded if possible. At each testing instant $t_1$ (e.g., in intervals of 10 s or 1 min), the instantaneous consumption—which corresponds as power to a slope in the diagram—is linearly extrapolated up to the end of the integration period (top dashed line 21). In this context the consumption is based on not bringing the power inverter into the circuit, that is, without discharging. The value E*(T) obtained in this manner is compared to threshold value $E_{max}$. If value E*(T)—as in the example of FIG. 2—is greater than $E_{max}$, an exceeding of the threshold is impending and the power inverter is brought into circuit. In this way a clearly lower consumption results at which no exceeding of the threshold is to be feared (lower dashed line 22).

Figure 3:
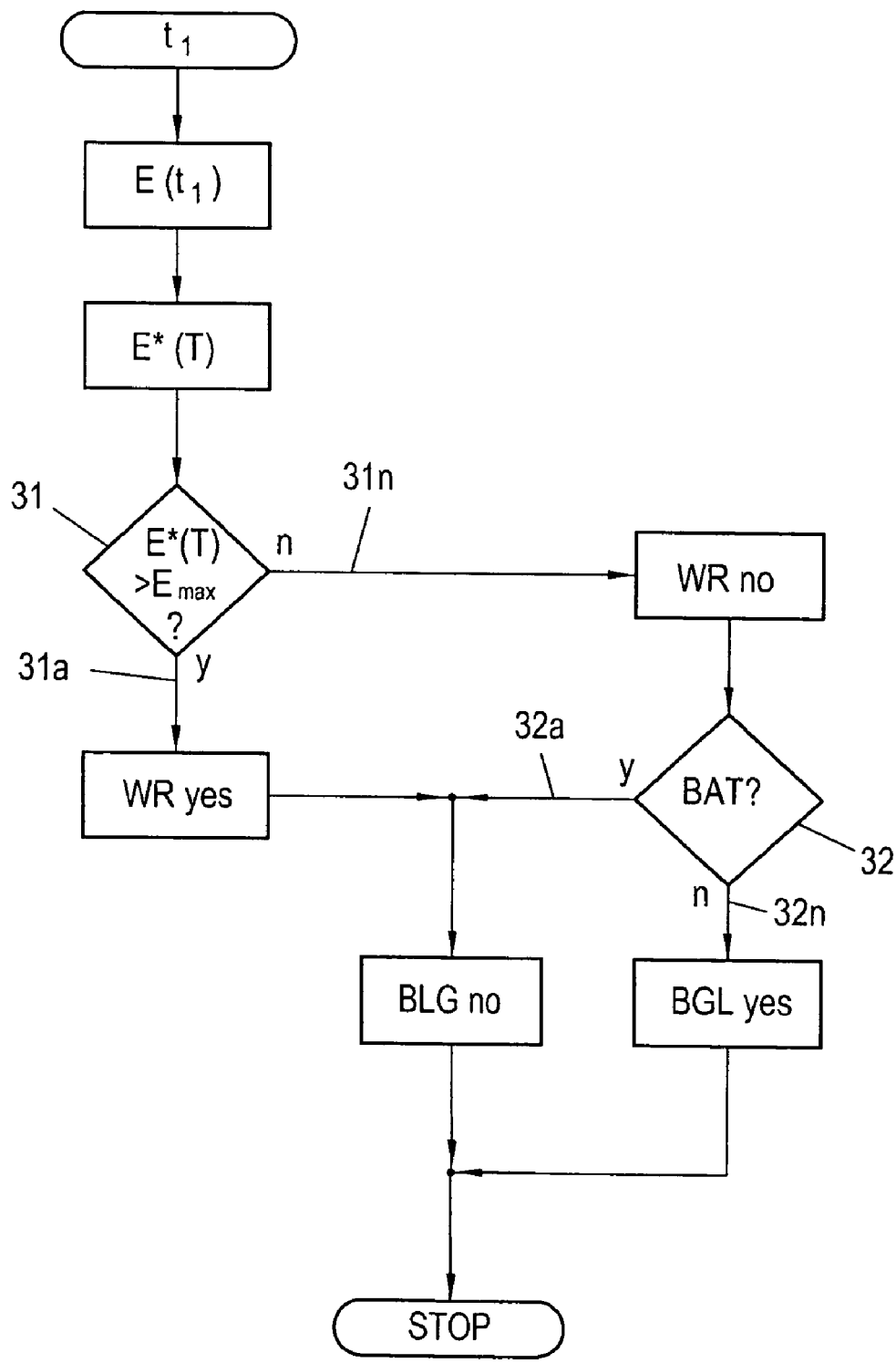
FIG. 3 is a flow diagram of the control of the supply of electricity of FIG. 1.

The control sequence is illustrated in the flow diagram of FIG. 3, which is run through at each test instant $t_1$. As a first step, the consumption quantity $E(t_1)$ that has accumulated thus far is determined via integrating meter Z1. Thereupon, the linear prognosis for E*(T) is generated; if at this instant the discharging is already active, the prognosis for E*(T) is created for the situation if the discharging were to be switched off. In decision 31 a check is made of whether value E*(T) obtained in this manner is greater than threshold value $E_{max}$; depending on the test result, there is a continuation via branch 31a or 31n. If E*(T) is greater than $E_{max}$, (branch 31a), the power inverter is activated (or remains in the active state) and energy consequently discharged, and the battery charger is switched off. However, via branch 31n—if E*(T) is less than $E_{max}$—the power inverter is switched off or remains in the passive state. Thereupon, in decision 32 the charging state of battery BAT is checked. If the charging state is sufficient, then there is a continuation via branch 32a and charger BLG is deactivated; otherwise—branch 32n—charger BLG is switched on to charge battery BAT.

The invention is especially suited for consumer systems in the single-digit kW range, where power inverters of known type may also be used as a particular advantage of the invention. In particular, power inverters conceived for use in solar installations, which are likewise designed for feeding alternating current into an alternating current network during the operation thereof, such as a SITOP device of the applicant, may be used.

The peak-load-compensating power supply system ASV prevents not only further maximum current consumption states; rather, it is—in an expanded version of the above exemplary embodiment—also suitable for compensating energy consumption in general so that only even lower integration values are produced and, by averaging of the mains current consumption, a more favorable electricity rate is achieved, and as a result the electricity bill is lower. Starting from the assumption that similar consumption profiles occur on a day-to-day basis, the control is able to determine when the (of course limited) battery capacity and feed power may be used most effectively. In the example considered here, it is assumed that the consumption periods to be compared are days, which is generally true in the case of the aforementioned fast food outlet or similar commercial operation; in the case of other applications, an appropriately adapted period of, for example, 24 hours, 48 hours or 168 hours, depending on the particular situation, is to be used as the consumption period instead of days. However, the consumption period should in no way be confused with the integration period T; rather, the consumption period extends over a plurality of integrations periods.

In this expansion, a self-learning application is prepared that measures and stores consumption, for example, in the form of consumption quantities that were measured for successive integration intervals T using integrating meter Z1 over an entire day unaffected by a load compensation. The consumption curve of a day logged in this manner, taking into account the battery capacity, is used as the basis for compensation of the energy consumption. From the consumption profile, the maximum consumption values (more precisely: consumption quantity values) are determined. First, the difference between the highest and second highest consumption value is calculated. Then, the battery discharge is calculated that results if the consumption is lowered to the second highest consumption value by infeeding it in the integration interval assigned to the maximum value. This first run of the calculation yields a first battery end charging state. In the next run, a calculation is made of which a second battery end charging state results if the consumption were lowered in the two highest integration intervals by feeding power at the value of the third highest consumption. If a positive second battery charging state (greater than 0) results, a third run may be carried out in which a third battery end charging state is calculated, which is reached after feeding power in the three highest integration intervals for lowering to the fourth-highest consumption value. These runs are repeated until the battery capacity is exhausted. The last successfully reached consumption value (i.e., with a positive assigned battery end charging state) is then used during the next day as the threshold value $E_{max}$.

Because the times of the relevant intervals are known, the charging of Battery BAT within the time frames between the integration intervals in which there is infeed into consumer connection terminal EN according to the above process can also be considered. Moreover, in this context, it is imperative that the energy balance due to charging loss have an efficiency of less than 100%—for example, in lead-acid accumulators approximately 80 to 85%, due to chemical losses and losses in charger BLG.

Of course, the evaluation may also be calculated for several days or consumption periods, whose consumption curves are stored in memory. A preliminary threshold value is then obtained for each day, from which the final threshold value is derived, for example, by selection of the largest of the preliminary threshold values, selection of the median value or an averaging procedure.

Also in active operation, based on the consumption comparison, a logging of the daily consumption is additionally performed that is then used for a recent calculation of threshold value $E_{max}$, the goal being to be able to react appropriately to changes in consumption, such as seasonal fluctuations.

Moreover, it can be provided that the user is able to enter in advance known changes in the current consumption—e.g., if an additional consumer device is added—of the control unit; an input/output EAE is assigned to the control unit for this purpose. Here, the data related to the expected consumption and expected switch-on time and duration of consumption are entered; they are plotted on the measured consumption curve, and the consumption curve obtained in this way is used as a basis for the calculation process described above.

Another expedient expansion relates to the control of the charging current of battery BAT. In the example described above, battery BAT is always charged if the full battery capacity has not yet been reached and an exceeding of the consumption threshold value $E_{max}$, is not impending. In one variant, the charging operation may be restricted to certain times that can be entered by the user via the input/output EAE, for example, only at night (nighttime electricity rate) or during the times when the fast food outlet is not busy. In another version or in combination with the previous version, control unit STE, for example, can limit the charging current of the battery or the energy absorption of charger BLG as needed via control of charger BLG, namely, if an exceeding of the threshold is impending and specifically to the extent that threshold value $E_{max}$ is maintained again. In this case a feeding from battery BAT via power inverter WR occurs only if the reduction of the charging current is insufficient to lower the consumption (including charging power) below the threshold value.

It should be noted that the invention is also suitable for those cases in which the rate model is time-dependent. For this purpose control unit STE also takes into account the different rate structures at different times, for example by multiplying the energy values and the electricity price (for example, EUR/kWh) in the prognosis; in FIG. 2 a cost consumption would then appear in place of the amount of energy used.

It should be noted that instead of battery BAT, which serves as a reversible direct current accumulator, a different direct current source can also be used. For example, a diesel or gasoline-powered generator may be used that is started when needed by the control unit and supplies a direct current, which is fed to the input of the power inverter. In contrast to the direct feeding from the generator into the connection circuit, this has the advantage that in the sense of the invention an infinitely variable feeding of additional electrical energy is achieved.

Yet another expansion of the invention is realized via a receiver unit, for example, in the form of a ripple-control receiver RSE that is connected to control unit STE and via which the discharging of energy can be triggered by the operator of the public network ENT, independent of the energy consumption of the consumer. In this way electrical energy can be fed from battery BAT back into network ENT, especially if consumption peaks occur there; this is generally done on the basis of a higher rate.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A device for covering the peak load of an electrical consumer (VB) that can be connected to an alternating current terminal of a public electricity network (ENT), comprising:

a power inverter (WR) that can be supplied from a direct current accumulator (BAT) and at the output thereof can be connected in parallel to the supply of electricity (EB) of the consumer (VB), a measuring device (Z1, Z2) that can be connected in the connection circuit (EN) of the consumer and a control device (STE) that is directed toward monitoring, with the aid of the measuring device (Z1, Z2), the energy consumption of the consumer (VB) and, in the event that the energy consumption value obtained in this way exceeds a given threshold value, putting in operation the power inverter (WR) in order to support the supply of the consumer, wherein the control device (STE) is directed toward estimating a quantity of electrical energy (E*(T)) consumed up until the end (T) of a given time interval from the energy consumption of the consumer (VB) and, in the event that the prognosis value obtained in this manner exceeds a given threshold value ($E_{max}$), putting the power inverter (WR) in operation in order to support the supply of the consumer.

2. The device as described in claim 1, wherein the control device (STE) is directed toward monitoring, with the aid of the measuring device (Z1, Z2), the energy consumption of the consumer (VB) and, in the event that the quantity of electrical energy consumed (E*(T)) that is obtained via linear extrapolation from the previous consumption quantity and the instantaneous energy consumption up until the end of a time interval were to exceed a given threshold value ($E_{max}$), putting the power inverter (WR) in operation in order to support the supply of the consumer.

3. The device as described in claim 1, wherein the control device is directed toward setting the energy that is fed through the power inverter to a value that results in the energy consumption or the consumption quantity being below the given threshold value.

4. The device as described in claim 1, characterized by a charger (BLG) for charging the direct current accumulator (BAT) that can be fed from the connection circuit (EN) of the consumer (VB).

5. The device as described in claim 4, wherein the charger (BLG) may be switched on/off by the control device (STE).

6. The device as described by claim 5, wherein the control device (STE) is directed toward switching on the charger only during those times that the power inverter (WR) is not in operation.

7. The device as described in claim 1, wherein the control device is directed toward logging the energy consumption of the consumer (VB) over a consumption period and from the consumption curve logged in this manner calculating a threshold value for the next consumption period according to a predetermined standard.

8. The device as described in claim 7, wherein, for the determination of the threshold value for the next consumption period, it is provided that the maxima of the consumption in the logged consumption period are determined, and that maximum is selected as the new threshold value for which, starting from the time-dependent consumption of the logged consumption period, a reduction of the consumption drawn from the electricity network (ENT) below this maximum is possible by switching on the power inverter (WR) in times of peak consumption without the storage capacity of the direct current accumulator (BAT) being exceeded.

9. The device as described in claim 1, characterized by a receiver device (RSE) that is connected to the control device (STE) and can be triggered via the feeding of energy through the power inverter (WR) independent of the energy consumption of the consumer (VB).

* * * * *